United States Patent [19]

Tobias et al.

[11] Patent Number: 5,385,957
[45] Date of Patent: Jan. 31, 1995

[54] HOTMELT INK JET COMPRISING IONOMERS HAVING MELTING POINTS FROM ABOUT 50° C. TO ABOUT 130° OR A SOFTENING POINT BELOW ABOUT 80° C., AND AN IMAGE-FORMING AGENT

[75] Inventors: Russell H. Tobias, Cary; Nicholas A. Davies, Elgin, Anthony J. Tortorello, Elmhurst, all of Ill., Robson F. Storey, Hattiesburg, Miss.

[73] Assignee: Videojet Systems International, Inc., Wood Dale, Ill.

[21] Appl. No.: 934,561

[22] Filed: Aug. 24, 1992

[51] Int. Cl.⁶ .................. C09D 5/00; C09D 11/00
[52] U.S. Cl. .................... 523/161; 524/430; 524/431; 524/432; 524/433; 525/333.5; 525/371.331.9; 106/20 R; 106/22 R; 106/23 A
[58] Field of Search ............ 523/161; 525/333.5, 525/371, 331.9; 524/430, 431, 432, 433; 106/20, 22, 23

[56] References Cited

U.S. PATENT DOCUMENTS

| | | | |
|---|---|---|---|
| 3,264,272 | 8/1966 | Rees | 260/78.5 |
| 4,687,791 | 8/1987 | Miyajima et al. | 523/161 |
| 5,010,125 | 4/1991 | Kruse et al. | 524/308 |

*Primary Examiner*—Paul R. Michl
*Assistant Examiner*—U. K. Raguru
*Attorney, Agent, or Firm*—Leydig, Voit & Mayer, Ltd.

[57] ABSTRACT

A hot melt ink comprising, ionomers and an image-forming agent, wherein the melting point of the ionomers is from about 50° C. to about 130° C., said ink exhibiting, in the molten stage, a viscosity from about 5 to about 60 centipoises (cps) at about 90° to 140° C. A method for ink jet printing comprising application of said ink in the molten state is also disclosed. A hot melt ink jet composition comprising a solid carrier component, an image-forming composition, and from about 5 to about 75 percent, by weight of an emulsifier is also disclosed, and the use thereof for ink jet printing.

23 Claims, No Drawings

HOTMELT INK JET COMPRISING IONOMERS HAVING MELTING POINTS FROM ABOUT 50° C. TO ABOUT 130° OR A SOFTENING POINT BELOW ABOUT 80° C., AND AN IMAGE-FORMING AGENT

FIELD OF THE INVENTION

This invention is related to the field of ink-jet ink compositions, particularly solid inks, which are used in thermal ink-jet printers, typically termed hot melt inks and, more particularly, to a new and improved hot melt ink.

BACKGROUND OF THE INVENTION

Liquid inks have been used in many types of ink-jet printers of which the major categories are "Drop-On-Demand" ink-jet and "Continuous" ink-jet. For Drop-On-Demand ink-jet, ink is normally stored in a reservoir and delivered by capillary action to a nozzle in the print head of the printer. A means exists to force a single drop of ink out of the nozzle whenever it is needed to print a single spot on the printed medium (for example, paper). For Continuous ink-jet, ink is forced out of the nozzle as a stream, which is broken into regularly spaced droplets by the application of mechanical perturbations. The trajectory of each drop is controlled typically by determining the change on each droplet and subjecting it to electrostatic forces. The drop can be directed either to a catcher for recycling through the main ink system or can be directed to the printed medium to form a printed spot.

Most ink-jet inks are liquids at room temperature. Liquid inks present various difficulties; for example, they do not respond the same to different printing media. Typically, liquid ink on office papers will produce a feathered appearance because it penetrates and spreads into the paper following fiber lines. Liquid inks that are designed for minimum feathering still require time to set, which may limit the rate that printed pages are stacked.

The print quality usually depends on the type of paper used, which also has an effect on the drying time and on waterfastness. Although water-borne inks have been widely used, they exhibit poor waterfastness. Also, in order to prevent the ink from drying in the jet, high concentrations of humectant such as diethylene glycol have been used. This also leads to a long drying (set) time for the print on the medium and poor print quality.

Liquid inks without curable additives typically are not useful on nonporous surfaces, such as metal, glass or plastic, because they are too prone to smearing.

Further, liquid inks are very sensitive to temperature changes which influence the ink viscosity and interfacial tension, which, in turn, influences the ink interaction with the medium.

It is clear from the foregoing that major problems with liquid ink-jet inks are (i) media dependent print quality, (ii) poor reliability, (iii) poor waterfastness, and (iv) a long drying (set) time for the printed ink.

One method of solving several of the above mentioned problems is to use a phase change or hot melt ink. The ink is normally solid at room temperature. When the ink is heated, the ink melts to form a low viscosity fluid which can be ejected as droplets.

Hot-melt ink was originally used by Berry et al. (U.S. Pat. No. 3,653,932, April 1972) in electrostatically controlled continuous ink-jet printing. The ink was comprised of a waxy component which is solid at room temperature. The term "hot melt ink" defines an ink that is in a solid phase at room temperature and in a fluid phase at the operating temperature. Many different types of hot-melt inks have been used.

These inks are also referred to, for example, in U.S. Pat. Nos. 4,490,731, 3,653,932, 3,715,219 and 4,390,369, entitled "Natural Wax-Containing Ink Jet Inks" and its continuation Ser. No. 507,918, filed Jun. 27, 1983; U.S. Pat. No. 4,361,843, entitled "Improved Ink Jet Compositions and Methods"; U.S. Pat. No. 4,400,215, entitled "Improved Ink Jet Formulation for Reduced Start-Up Problems", and its continuation application U.S. Ser. No. 522,837, filed Aug. 12, 1983; U.S. Ser. No. 394,154, filed Jul. 1, 1982, entitled "Stearic Acid Containing Ink Jet Inks", now abandoned, and its continuation application, U.S. Ser. No. 565,124, filed Dec. 23, 1983; U.S. Pat. No. 4,3861,961, entitled "Heterologous Ink Jet Ink Compositions", and its continuation application, Ser. No. 501,074, filed Jun. 5, 1983; U.S. Ser. No. 668,095, filed Nov. 5, 1984, now abandoned, and its continuation Ser. No. 006,727, filed Jan. 23, 1987; U.S. Ser. No. 672,587, filed Nov. 16, 1984, entitled "Low Corrosion Impulse Ink Jet Ink", now abandoned, and its continuation U.S. Ser. No. 037,062, filed Apr. 13, 1987.

These "hot-melt" inks normally comprise vehicles, such as natural waxes, resins and/or long chain fatty acids, esters or alcohols which melt when the ink is heated to jetting temperatures. Upon jetting, heated droplets impact the substrate and immediately freeze on the substrate surface. This phenomenon is advantageous in several respects in that dark, sharply defined print may be produced. This print may be slightly raised, suggesting that the print is engraved. Since the ink is solid at room temperature, during storage and shipment the colorant systems have less tendency to separate out of the ink. This has facilitated the use of various colorant systems, such as certain pigment-based systems, which would not normally have been used in liquid inks.

By way of example of the types of hot-melt inks employed to date, one may refer to U.S. Pat. No. 3,653,932 which discloses an ink containing a dialkyl ester of sebacic acid; U.S. Pat. No. 3,715,219 which discloses an ink containing a higher aliphatic alcohol; U.S. Pat. Nos. 4,390,369 and 4,484,948 which disclose inks containing a natural wax; EP 99,682 which discloses an ink containing stearic acid; and U.S. Pat. No. 4,659,383 which discloses an ink that contains an acid or alcohol of C20–C24 chain length, optionally in the presence of a ketone having a comparatively high melting point.

Not all of the aforementioned hot-melt inks exhibit high solubility of dyes, and thus the types of dyes that can be used are limited. In addition, these inks have not necessarily been stable against prolonged heating or repeated heat cycles. EP 181,198 discloses a hot-melt type ink that has a solid pigment dispersed in a wax having a melting point higher than 65° C. or an aliphatic acid or alcohol of C18–C24 chain length. This ink, however, has the problem of poor dispersion stability.

Another disadvantage to many hot-melt phase-change inks is the fact that the physical properties of the printed images, such as resistance to abrasion and the like, are limited because the inks, when cooled, are only as hard as their principal components, which are typically resinous in nature. The inks must be liquid at operating temperatures, and because operating temperatures are naturally limited due to practical considerations, including the fact that the inks when applied to the substrate, such as paper, cannot cause burning or charring of the substrate, the melting temperature of the ink is likewise limited.

In U.S. Pat. No. 3,653,932 the composition is required to have a melting point which does not exceed 51° C. and contains a didodecyl sebacate which is a highly viscous material. In order to overcome the problems associated with that formulation, U.S. Pat. No. 4,390,369 proposes the use of a composition which comprises a natural wax and has a melting point below about 75° C. The use of natural waxes is also proposed in European application No. 097823, where the composition comprises a mixture of paraffin wax and stearic acid. However, such compositions do not adhere satisfactorily to plastics substrates and suffer from smudging. Additionally, problems are encountered due to the high viscosity of the components where synthetic materials are used.

U.S. Pat. No. 5,066,332 discloses a low-corrosion hot-melt ink that contains 0.5% to 10% by weight of a metallo-organic compound such as overbased calcium sulphonate, basic barium sulphonate and overbased sulphurized calcium alkyl phenate as a corrosion inhibitor.

U.S. Pat. No. 5,065,167 teaches an ink-jet ink including a waxy carrier that is solid at 25° C. and liquid at the operating temperature of an ink-jet nozzle and a driver having a critical pressure greater than 10 atmospheres, the carrier and driver being miscible in liquid phase.

U.S. Pat. No. 5,053,079 relates to a dispersed, pigmented hot melt ink that contains a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle.

U.S. Pat. No. 5,047,084 relates to an ink-jet ink in the form of a microemulsion of an organic vehicle phase having a colorant dispersed therein and an aqueous phase containing a surfactant, the vehicle phase preferably being liquid at 70° C. and solid at 20° C.

U.S. Pat. No. 5,041,161 relates to jet inks that comprise vehicles, such as glyceryl esters, polyoxyethylene esters, waxes, fatty acids, and mixtures thereof, which are semi-solid at temperatures between 20° and 45° C.

U.S. Pat. No. 5,021,802 describes impulse ink or bubble-jet inks which comprise 90–99.9% by weight of aqueous sol-gel medium and 0.1–10% by weight colorant. The inks are thermally reversible sol-gels which are gels at ambient temperatures and sols at temperatures between about 40°–100° C.

U.S. Pat. No. 5,000,786 relates to an ink composition for use in an ink-on-demand, ink-jet printer which includes a first component, a second component having a higher melting point than the first component, and a colorant. During printing, the ink is melted and jetted onto a recording medium. The first component is selected to permeate from the melted dot of ink into the recording medium. As its concentration in the dot of ink decreases and the temperature of the ink cools, the second component with the colorant will solidify and the first component will fix the second component and colorant to the recording medium. The second component is indicated to be any of many, various compositions, including o-toluenesulfonamide and p-toluenesulfonamide. In all instances, a first component is present that typically is a wax-type of material, such as a petroleum wax or a candelilla wax having a high melting point but not more than about 70° C., such as paraffin, paraffin wax, microcrystalline wax or solid-type wax formed from a combination of the compounds of these materials.

U.S. Pat. No. 4,931,095 relates to an ink for hot-melt ink-jet printing comprising a benzoate solvent which is solid at room temperature. This ink is suitable for jetting onto an opaque substrate such as paper for directly readable print, or onto a transparent substrate, such as an acetate or polycarbonate sheet, to make a projectable transparency.

U.S. Pat. No. 4,835,208 relates to a process for applying a thermoplastic composition as a series of discrete droplets from a non-contact ink jet printing apparatus to form separate drops on a substrate moving relative to the apparatus. The molten composition is thermally stable at the temperature of application and is applied at a temperature in excess of 100° C. The process is said to be used to apply the molten composition to a variety of substrates using on-demand or continuous non-contact ink-jet application techniques and to be of especial use in the application of thermoplastic inks to non-porous substrates using an on-demand ink-jet printer.

U.S. Pat. No. 4,830,671 relates to a hot-melt ink composition consisting of a resinous binder which is prepared by the condensation reaction of about one stoichiometric equivalent of polymerized fatty acid, about two stoichiometric equivalents of a diamine and about two stoichiometric equivalents of a monocarboxylic acid and a colorant distributed throughout the resinous binder in an amount sufficient to impart a predetermined color to the resulting hot-melt ink composition.

U.S. Pat. No. 4,822,418 relates to an ink-jet composition for use in drop-on-demand ink jet printers comprising 85–99 weight percent of a vehicle consisting essentially of dibutyl sebacate and oleic acid. In the preferred embodiment, the dibutyl sebacate comprises between about 40 to 65, preferably about 60 weight percent of the ink. The subject ink, when utilizing an infrared readable colorant such as nigrosine base, is particularly suited for generating IR readable bar codes.

U.S. Pat. No. 4,758,276 relates to a stearic acid-containing ink-jet ink for use in an ink-jet apparatus which features good print quality. The ink-jet ink is discharged from the ink-jet ink apparatus at temperatures above ambient.

U.S. Pat. No. 4,741,930 relates to color printing characterized by high color density and color contrast, provided by jetting an ink composition composed of an optically clear, phase-change base material and a primary subtractive color dye which is soluble in the base material, onto the surface of a printing medium to form a multiplicity of closely spaced color dots or spots arranged to define a line or character on the medium. Each dot consists of one or more well defined, optically clear, semi-transparent color layers each of which has a different color so that the observed color of each dot is a true subtractive mixture of the colors in the layers. Specific ink compositions are also disclosed.

U.S. Pat. No. 4,684,956 relates to a process for applying a thermoplastic image-forming composition as a series of discrete droplets from a non-contact ink-jet printing apparatus to form separate drops on a substrate moving relative to the apparatus. The molten composition is thermally stable at the temperature of application and is applied at a temperature in excess of 100° C.

U.S. Pat. No. 4,659,383 relates to a hot-melt impulse-ink-jet ink which comprises a $C_{20}$–$C_{24}$ acid or alcohol-containing vehicle, preferably behenic acid, and a suitable coloring agent. The preferred ink has a melting point above about 65° C., exhibits very good jettability, good heat stability at a reservoir temperature of 90° C., good material compatibility, and an improved print quality. The preferred ink comprises about 80% natural behenic acid, 15% of a ketone (such as stearone), 3% coloring agent, and 2% of a plasticizer intended to improve print quality. The subject inks are jetted at relatively high temperatures (80°–90° C.) using impulse-ink-jet devices.

In related application Ser. No. 394,153, filed Jul. 1, 1982 (Lin et al), a number of hot melt impulse-ink-jet inks are disclosed which are described as being solid or semi-solid at ambient temperature. In addition to stearic acid, the Lin et al. application discloses that additives such as oleic acid, typophor black, nigrosine base, benzyl ether, compounded or chemically modified waxes (including natural or other synthetic substances), a coloring agent or dye, such as oil or solvent soluble dye, etc. may be used in formulating the disclosed hot-melt inks.

U.S. Pat. No. 5,006,170 relates to hot-melt ink compositions suitable for ink-jet printing which comprise a colorant, a binder, and a propellant. In one embodiment, the binder comprises a liquid crystalline material. The hot-melt inks with liquid crystalline binders are said to exhibit sharp melting points, which enables rapid melting of the ink and rapid solidifying of the ink on the printing substrate, thereby enabling rapid printing speeds. In addition, hot-melt inks with liquid crystalline binders are said to exhibit high shear thinning behavior, which means that under shear or stress, the melt viscosity is lowered. The inks are subjected to shear or stress as they pass through the jetting nozzle of the printer, and the ink viscosity is lowered during the printing process, which enables increased printing speed and also results in enhanced print quality, since the lowered viscosity of the ink enables a high degree of interaction between the ink and the printing substrate. Examples of suitable liquid crystalline materials for the inks include certain alkyl thio- beta -D-glucosides.

Other types of inks containing liquid crystalline materials include those of U.S. Pat. No. 3,776,742, which discloses an electrically conductive aqueous base ink for use in printing on a cellulose containing base member by formation of discrete droplets. The ink comprises a water soluble dye, a water soluble inorganic conductive material in an amount of 1 to 20 percent, a water soluble polyol in an amount of from 5 to 50 percent, an organic crystallizable material in an amount of from 5 to 20 percent, which organic material acts temporarily as a plasticizer for cellulose, and water. Typical crystallizable materials include sugars such as glucose, sucrose, fructose, and the like, including glucono D-lactone.

Inks containing aromatic sulfonamides have been suggested in the art. For example, U.S. Pat. No. 4,878,946 relates to a hot-melt type ink for thermal ink-jet printers that comprises an oil-soluble dye dissolved in at least one compound selected from the group consisting of a phosphoric acid ester, an aromatic sulfonamide, a hydroxybenzoic acid ester and a phthalic acid ester, the compound being in solid state at room temperature. The dye solvents that are suggested include phosphoric acid esters such as triphenyl phosphate, tri-p-tolyl phosphate, etc; aromatic sulfonamides such as N-cyclohexyl-p-toluene-sulfonamide, N,N-dichloro-p-toluenesulfonamide, N-butyl-p-toluenesulfonamide, benzenesulfonamide, p-toluenesulfonamide, o-toluenesulfonamide, benzylsulfonamide, etc; hydroxybenzoic acid esters such as ethyl p-hydroxybenzoate, n-propyl p-hydroxybenzoate, iso-propyl p-hydroxybenzoate, n-butyl p-hydroxybenzoate, iso-butyl p-hydroxybenzoate, n-heptyl p-hydroxybenzoate, n-nonyl p-hydroxybenzoate, phenyl salicylate, octyl salicylate, p-tert-butylphenyl salicylate, etc; and phthalic acid esters such as dicyclohexyl phthalate, diethyl phthalate, dodecyl phthalate, diphenyl phthalate, dimethyl isophthalate, dimethyl terephthalate, diethyl terephthalate. The only sulfonamide actually employed in a working example, however, is N-cyclohexyl-p-toluenesulfonamide.

U.S. Pat. No. 4,820,346 relates to a hot-melt ink for an ink-jet printer that is formed from a solid organic solvent having a melting point less than 150° C., that may contain a sulfonamide, or mixture thereof, and a low molecular weight thermosetting resin having a high hydroxyl number, together with a dye. The ink is said to have excellent jetting characteristics, form a hard, stable print raised above the surface of the substrate, provide high dot resolution, and remain colorfast both in the ink jet printer and on the paper, even when exposed to continued high temperatures. The solid organic solvent, in a preferred embodiment, comprises one or more aromatic sulfonamides. In particular, primary alkyl ($C_1$–$C_9$) benzenesulfonamides are said to have given excellent results. Particularly good results purportedly were obtained when the alkyl group was para to the sulfonamide group. One preferred solvent was a mixture of p-toluenesulfonamide and p-ethylbenzenesulfonamide. Preferably, the solvent mixture also comprised up to about 5 wt. % of a $C_3$–$C_9$ alkylbenzenesulfonamide, with particularly good results supposedly being obtained using about 2 wt. % p-n-butylbenzenesulfonamide or about 2 wt. % p-n-nonylbenzenesulfonamide. Good results were also alleged to have been obtained using solvent mixtures of ortho- and para-toluenesulfonamide, such as that sold under the trademark "Santicizer 9" by the Monsanto Chemical Corporation. In all instances, the solid organic solvent was used in combination with a low molecular weight thermosetting resin having a high hydroxyl number.

Japanese published specification 55-54368 also discloses the use of certain low-crystallinity compositions for use in hot-melt ink-jet compositions. The utility of the crystalline materials disclosed therein is limited by the materials' lower melting points and other undesirable properties, such as excessive volatility and decomposition at operating temperatures. Another problem associated with such hot-melt inks is the tendency of the molten formulation to "super-cool" that is to continue to exist in the liquid stage at temperatures far below the melting point of the crystalline material. This is undesirable because it lengthens the time necessary for the printed images to sufficiently set to resist smearing, abrasion, and feathering.

Crystalline materials that would be capable of forming desirable, hard images, have not, in general, been used as components in hot-melt inks, because of their high melting points. If they have been used, it has only been in combination with a principal additional component having a lower melting point, such as a waxy material, thus causing such ink formulations to suffer from the same type of problems as the other compositions in the prior art that employ such soft, waxy, low melting components as the principal solvent.

Waxed-based hot-melt jet inks demonstrate good wettability but poor adhesion on many nonporous substrates, whereas crystalline hot-melt jet inks have poor wettability on low energy surfaces, but good adhesion to higher energy surfaces. Heretofore, no solution to this problem with crystalline-based hot melt jet inks has been found.

Ethylene glycol distearate has heretofore been used only in non-ink jet applications, such as those shown in Japanese Patent Nos. 2284971, 1242286, 1042456, 1026494, 62160284, or suggested for use in ink-jet formulations that are not of the hot-melt type, but rather are water-borne, as shown in Japanese Patent No. 3079682.

SUMMARY OF THE INVENTION

The present invention overcomes many of the problems associated with the prior art hot-melt compositions while achieving distinct advantages thereover. In accordance with one aspect of the present invention, a hot-melt ink-jet ink formulation is provided that has an ionomeric composition as the solid solvent. It is now possible to formulate inks that have very good adherence to a variety of substrates and yield printed images with good flexibility and improved smear resistance, when applied to a substrate. Such inks may be applied at acceptable temperatures, such as from about 90° to about 140° C., preferably from about 100° to about 130° C., and most preferably from about 100° to about 120° C.

The hot-melt inks of the present invention may comprise an ionomeric composition and an image-forming agent, wherein the melting point of the ionomeric composition is from about 50° C. to about 130° C.

Said ink exhibits, in the molten stage, a viscosity from about 5 to about 60 centipoises at about 90° C. to 140° C.

The present invention also provides a method for ink-jet printing comprising:
(a) providing a thermally reversible hot-melt ink which is a solid at about 25° C. and a liquid at temperatures between about 50° C.–130° C., said ink comprising:
  (i) an ionomeric composition; and
  (ii) an image-forming composition;
(b) elevating the temperature of said ink composition to between about 90° and about 140° C., to cause said ink to form a liquid solution or suspension of said image-forming composition;
(c) jetting said ink onto a substrate in the form of images;
(d) allowing said ink to harden upon cooling on said substrate.

In accordance with another aspect of the present invention, hot-melt ink-jet compositions containing a solid carrier component and an image-forming composition, are provided that also have incorporated therein certain emulsifiers. The ink is thermally reversible and is a solid at about 25° C. and a liquid at temperatures between about 50° C. to about 130° C. Such compositions therefore have the advantages provided by the presence of the solid carrier, such as an ionomeric composition, a eutectic blend as disclosed in copending application no. [attorney's docket no. 38899] which is incorporated herein by reference, or a crystalline material, while also exhibiting good wettability, such as that shown by wax-based hot-melt inks. Thus, such compositions have improved wetting and adhesion properties that allow application to a wide range of organic nonporous substrates.

Further, in accordance with the present invention, ethylene glycol distearate may be employed as a component in the hot-melt ink-jet formulation containing a solid carrier, such as an ionomeric composition, a eutectic blend as disclosed in said copending application no. [attorney's docket no. 38899], or a crystalline carrier material, to provide a composition with improved properties.

DETAILED DESCRIPTION OF PREFERRED EMBODIMENTS

IONOMERIC COMPONENT

As indicated, in one aspect of the present invention, an ionomeric composition is employed as the solid solvent. The ionomeric composition comprises ionomers that have a softening point of about 80° C., or lower. By employing the appropriate selection of compounds for the ionomeric compositions, it is possible to formulate inks that have good adhesion to a variety of substrates and, when applied to a substrate, form printed images that are flexible and exhibit good smear resistance. They may be applied at acceptable temperatures, such as from about 90° to about 140° C., preferably from about 100° to about 130° C., and most preferably from about 100° to about 120° C.

Typically, ionomers contain a certain number of inorganic salt groups attached to a polymer chain, such as from about 1 up to 15 mol % ionic groups pendant to a base polymer, such as a hydrocarbon, oxygen or nitrogen-containing hydrocarbon or perfluorinated polymer chain. Preferably they contain from about 2 up to about 10 mol % ionic groups.

The pendant ionic groups interact or associate to form ion-rich regions contained in a nonpolar polymer matrix. The resulting ionic interactions strongly influence polymer properties and application. The salt groups chemically combined with a nonpolar polymer backbone have a dramatic influence on polymer properties not observed with conventional homopolymers or with copolymers based on nonionic species.

The ionic interactions and resultant polymer properties are dependent on the type of polymer backbone (glassy, plastic or elastomic); ionic functionality (ionic content), generally 1–15%; type of ionic moiety (carboxylate, sulfonate, phosphonate or quartenary ammonium); degree of neutralization (0–500%); and type of cation (ammonium, monovalent, multivalent or metal).

An ionomer can be defined as a polymer composed of a covalently-bonded backbone containing a small amount of pendant carboxylic acid, sulfonate or phosphate groups, or pendant or main-chain quaternary ammonium groups usually less than 15 mole percent, which are neutralized, partially or completely, to form an ionomer. Ionic hydrocarbon polymers for elastomers or plastics are disclosed in U.S. Pat. No. 3,264,272.

Ionomers may be prepared by copolymerization of a functionalized monomer with an olefinically unsaturated monomer or direct functionalization of a preformed polymer. Typically, carboxyl-containing ionomers are obtained by direct copolymerization of acrylic or methacrylic acid with ethylene, styrene, and similar comonomers by free-radical copolymerization. The resulting copolymer is generally available as the free acid, which can be neutralized to the degree desired with metal hydroxides, acetates, and similar salts.

Another route to ionomers involves modification of a preformed polymer. Sulfonation of polystyrene, for example, permits the preparation of sulfonated polystyrene (S-PS) with a content of sulfonic acid groups in proportion to the amount of sulfonating agent. Such reactions may be conducted in homogeneous solutions, permitting the direct neutralization of the acid functionality to the desired level. The neutralized ionomer may be isolated by conventional techniques, i.e., coagulation in a non-solvent, solvent flashing, etc.

Useful ionomers include:

| Useful ionomers include: | |
| --- | --- |
| poly(ethylene-co-methacrylic acid) | Surlyn ® |
| poly(butadiene-co-airylonitrile co-acrylic acid) | Hycar ® |
| perfluorosulfonate ionomers | Nafion ® |
| perfluorocarboxylate ionomers | Flemion ® |
| telechelic polybutadiene | Hycar ® |
| sulfonated ethylene-propylene terpolymer | Ionic Elastomer ® |
| poly(styrene-co-acrylic acid) | |
| sulfonated polystyrene | |
| sulfonated cetyl elastomer | |
| sulfonated polypentenamer | |

Of particular importance are the low molecular weight difunctional carboxyl-terminated polymers. Such polymers may be made by anionic polymerization or free-radical initiated polymerization processes. The first route offers polymers of relatively narrow molecular weight distribution. However, in the molecular weight ranges of interest (1,500–6,000), substantial amounts of organometallic catalyst are required.

The free-radical-initiated process results in polymers of broader molecular weight distribution. Such polymers may be made with 1,3-butadiene and acrylonitrile. The selection of appropriate solvents minimizes chain transfer with solvent which has an important effect on the final polymer functionality. Typically t-butanol is preferred, although tetrahydrofuran and acetone have also been employed. The liquid polymers are recovered by solvent stripping to yield products with viscosities of 10–40 Pa.s (100–400 P).

The carboxyl-terminated polymers react with suitable metal alkoxides, such as potassium hydroxide, to yield neutralized telechelic polymers.

Ionomers of use in the present invention may be made by first forming a functional polymer. Useful polymers include acrylic copolymers, polyester-acrylic graft copolymers, polyester polymers and urethane polymers.

Useful acrylic copolymers are carboxyl functional acrylic copolymers which can be produced by polymerizing monomers in bulk, in an organic solvent, or by other suitable processes to produce carboxylic functional polymer. The carboxylic acid functional acrylic copolymer comprises copolymerized ethylenically unsaturated monomers, including ionizable carboxyl monomers, to produce a copolymer containing reactive primary carboxylic acid groups and having a number average molecular weight between 500 and 100,000, and preferably between 1,000 and 40,000. Number average molecular weights are typically measured by GPC according to ASTM methods such as D3016-72; D3536-76; D3593-80; or D3016-78.

The acrylic copolymers have a Tg between 20° C. and 100° C. as calculated by the FOX equation based on the weight ratio of specific monomers. The Acid No. of the carboxylic acid functional polymer is between 10 and 200 and preferably is between 30 and 90. The copolymers can be produced by bulk, solvent, or suspension polymerization of ethylenically unsaturated monomers including carboxylic acid monomers, activated by peroxide or azo or other free radical initiator at polymerization temperatures typically between 40° C. to 170° C. and preferably between 70° C. to 150° C. Typically 0.2% to 5% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azobisisobutyronitrile and persulfate or ammonium persulfates. Molecular weight control can be achieved by adjusting temperature, initiator level, or by the addition of chain transfer agents, such as the common mercaptans.

Typical solvents useful in preparing the organic solvent-borne acrylic copolymers can include for instance, xylene, toluene, ethyl acetate, acetone, methylisobutyl ketone, methyl n-amyl ketone, methylisoamyl ketone, ethylamyl ketone, amyl acetate, methylethyl ketone, ethyl alcohol, mineral spirits, ethylene glycol monoethyl ether acetate, and other aliphatic, cycloaliphatic and aromatic hydrocarbons, esters, ethers, ketones and alcohols. After the polymerization is completed, the solvents may be stripped off to produce a solid polymer for use in an ink-jet formulation.

Copolymerizable ethylenically unsaturated monomers useful in producing the carboxylic acid functional acrylic copolymer are monomers containing carbon-to-carbon, ethylenic unsaturation and include vinyl monomers, acrylic monomers, allylic monomers, acrylamide monomers, and mono-and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The carboxylic acid functional polymer comprises copolymerized monomers including at least 1% by weight ionizable carboxylic acid monomers which include acrylic and methacrylic acids as well as olefinic unsaturated acids. Acrylic acids include acrylic and methacrylic acid, ethacrylic acid, alpha-chloracrylic acids, alpha-cyanoacrylic acid, crotonic acid, and beta-acryloxy propionic acid. Olefinic unsaturated acids include fumaric acid, maleic acid or anhydride, itaconic acid, citraconic acid, mesaconic acid, muconic acid, glutaconic acid, aconitic acid, hydrosorbic acid, sorbic acid, alpha-chlorosorbic acid, cinnamic acid, and hydromuconic acid. On a mole basis, the carboxylic acid functional polymer contains at least 1% copolymerized carboxyl functional monomers and preferably between 5% and 15% carboxylic acid monomers.

Polyester polymers comprise the esterification products of glycols, diols, or polyols with excess equivalents of dicarboxylic acid or polycarboxylic acids. Linear aliphatic glycols are esterified with greater molar amounts of aromatic dicarboxylic acid and/or linear saturated dicarboxylic acid having between 2 and 36 linear carbon atoms such as adipic, azelaic, succinic, glutaric, pimelic, suberic or sebacic acid to produce low molecular weight polyesters. Commercially available linear saturated dicarboxylic acids are dodecanedioic acid, dimer fatty acids, or azelaic acid. Aromatic dicarboxylic acids (anhydrides) include phthalic, isophthalic, terephthalic, and tetrahydrophthalic. Minor amounts of polyfunctional acids such as trimelletic acids can be added. Suitable glycols include linear aliphatic glycols having 2 to 16 carbon atoms such as 1,3- or 1,4-butylene glycol, 1,6-hexane diol, neopentyl glycol, propylene glycol, ethylene glycol and diethylene glycol, propylene, and dipropylene glycol, and similar linear glycols, and hydrogenated Bisphenol A. Minor amounts of polyols can be used such as glycerol, pentaerythritol, dipentaerythritol, or trimethylol ethane or propane. The molar deficiency of the glycol over the greater molar amounts of aromatic and linear saturated dicarboxylic acid is between about 1% and 50%. Hence, the polyester may contain an excess of unreacted carboxylic groups to provide a carboxyl polyester having an Acid No. between 5 and 300. The molecular weight of useful polyester polymers are between 500 and 50,000 and preferably between 1,000 and 10,000. Glycol can be esterified with minor amounts of up to about 20% by weight of unsaturated dicarboxylic acids (anhydrides) including maleic, fumaric or itaconic acids; or monocarboxylic acids such as acetic, benzoic, and higher chain aliphatic acids up to about 12 carbon atoms as well as aromatic acids. The polyester component can be produced by solvent or bulk polymerization although bulk polymerization is preferred. The raw materials can be charged in bulk and esterification polymerized at temperatures typically between 170° C. to 240° C. although moderately higher or lower temperatures can be utilized satisfactorily. Azeotropic removal of water with a suitable solvent, such as xylene, often helps to reduce processing times. An esterification catalyst can be used, typically at less than 1% levels based on charge.

Grafted copolymers of polyester and acrylics can be produced by free-radical polymerization of ethylenically unsaturated monomers, including acrylic and carboxyl monomers, in the presence of a preformed molten or fluid polyester at temperatures sufficient to induce addition copolymerization of the monomers along with some grafting onto the polyester backbone. Organic solvents are not required, but can be added if desired to provide desired viscosity in solvent coatings. On a weight basis, the polyester-acrylic graft polymer may contain between 5% and 90% polyester polymer component with the balance being the acrylic polymer component. The polyester component of the polyester acrylic graft polymer is a moderate molecular weight polymer having a number average molecular weight between about 500 and 50,000 and preferably between 1,000 and 5,000. The polyester polymer should have an Acid No. above about 5, preferably between 20 and 100, and can be prepared as previously described.

The acrylic polymer component of the polyester-acrylic graft polymer comprises in-situ copolymerized ethylenically unsaturated monomers, including acrylic monomers and carboxyl monomers, along with other ethylenically unsaturated monomers if desired. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloracrylic acid, alpha-cyanoacrylic acid crotonic acid, beta-acryloxy propionic acid, and beta-styrl acrylic acid. Other ethylenically unsaturated monomers have been previously described herein. The copolymerized monomers for the acrylic component of the polyester-acrylic graft polymer comprises copolymerized monomers, on a weight basis between 1% and 100% of acrylic monomer, between 0% and 30% acrylic or methacrylic carboxylic acid monomer, with the balance being other ethylenically unsaturated monomers. Preferred acrylic components comprise between 20% and 90% acrylic monomer, between 5% and 15% carboxyl acid monomer, with the balance being other ethylenically unsaturated monomers. It should be noted that the carboxyl functionality can be part of the polyester polymer or part of the grafted acrylic polymer or on both polymers. The Acid No. of the polyester-acrylic graft polymer is preferably between about 20 and 100. The polyester-acrylic graft polymer preferably comprises by weight between 5% and 90% polyester polymer component and between 10% and 95% acrylic polymer component. The number average molecular weight of the polyester-acrylic graft polymer is between about 2,000 and 100,000 while preferred molecular weights are between 5,000 and 50,000 as measured by GPC. GPC chromatograms of the polyester and the grafted polyester-acrylic indicated that good grafting efficiency can be obtained.

Urethane ionomers can be produced with terminal carboxyl groups as well as terminal blocks, which can be crosslinked by zinc organic salts upon heating in accordance with this invention.

Carboxyl functional urethanes can be produced by coreacting diisocyanates with a diol or a polyol and a hydroxyl acid. Linear polyurethanes are obtained from difunctional reactants while branched polyurethanes are produced from the combination of difunctional and higher functional reactants. Urethanes can be prepared from any of several available aromatic, aliphatic, and cycloaliphatic diisocyanates and polyisocyanates. Suitable polyisocyanates can be di- or triisocyanates such as, for example, 2,4- and 2,6-tolylene diisocyanates, phenylene diisocyanate; hexamethylene or tetramethylene diisocyanates, 1,5-naphthalene diisocyanate ethylene or propylene diisocyanates. Trimethylene or triphenyl or triphenylsulfone triisocyanate, and similar di- or triisocyanates or mixtures thereof. The polyisocyanate can be generally selected from the group of aliphatic, cycloaliphatic and aromatic polyisocyanates such as for example hexamethylene 1,6-diisocyanate, isophorone diisocyanate, 1,4-dimethyl cyclohexane, diisocyanate, diphenylmethane 2,4-toluene diisocyanate, 2,6-toluene diisocyanate and mixtures thereof, polymethylene polyphenyl polyisocyanate, or isocyanate functional prepolymers.

A wide variety of diols and polyols can be used to prepare urethanes with a wide range of properties. Polyethers, such as the polytetramethylene oxides can be used to impart flexibility as well as the polyethylene oxides and polypropylene oxides. Simple diols that can be used include neopentyl glycol, 1,6-hexane diol, and longer chain diols having 12, 14 and higher carbon chains. Branching can be introduced with polyols such as trimethylol propane and pentaerythritol. Hydroxyl functional polyesters and various other hydroxyl functional polymers are also suitable. Useful polyols preferably contain two, three, or four hydroxyl groups for coreaction with the free isocyanate groups. Useful polyols are: -diols such as ethylene glycol, propylene glycols, butylene glycols, neopentyl glycol, 1,4-cyclohexane dimethanol, hydrogenated bisphenol A, etc.; triols such as glycerol, trimethylol propane, trimethylol ethane; tetrols such as pentaerythritol; hexols such as sorbitol, dipentaerythritol, etc.; polyether polyols produced by the addition of alkylene oxides to polyols; polycaprolactone polyols produced by the addition of monomeric lactones to polyols, such as caprolactone; and hydroxyl terminated polyesters.

The polyurethane also contains a coreacted hydroxy-acid material. The hydroxy-acid contains at least one reactive hydroxy group for coreacting with the isocyanate during polymer synthesis and at least one carboxy group which is essentially non-reactive to the isocyanate groups during the polymer synthesis. Examples of alkyl acids are 2,2-dihydroxymethyl propionic acid, 2,2-dihydroxymethyl butyric acid, glycolic acid, and the like; other acids are lactic acid, 12-hydroxy stearic acid, the product of the Diels-Alder addition of sorbic acid to di-(2-hydroxyethyl) maleate or fumarate, or low molecular weight (300 to 600) precondensates of polyols with tribasic acids such as trimelletic anhydride or Ricinoleic acid. Acid functionality can be introduced with materials like 12-hydroxystearate, dimethylolpropionic acid, and various other hydroxy acids as well as carboxylated polyesters such as the Niax PWB-1200 (Union Carbide). Monohydroxyl acids will place the acid functionality at the end of the chain, while the diol acids will randomly place the acid groups in the chain.

When isocyanates are reacted with diols and polyols of various types, the reaction rate may be enhanced by the use of catalysts. Common isocyanate catalysts are suitable and examples include dibutyltindilaurate, dibutyltinoxide, and the like.

The number average molecular weight of the urethane can be between 500 and 100,000 and preferably between 5,000 and 50,000 as measured by GPC.

In accordance with this invention, the useful level of neutralization of the carboxylic acid functional copolymer, is usually above 10% and preferably between about 30% and 200%, and most preferably between 50% and 150% neutralization. The neutralization may be with metal hydroxides, metal oxides, amines, or the like to introduce metal or amine cations that are univalent or multivalent.

The useful ionomers typically have a molecular weight from about 300 to about 10,000, most typically from about 500 to about 4,000. Of importance also is the viscosity of the ionomers.

OTHER SOLID COMPONENTS

The ionomers will usually not be the sole component in the hot-melt ink used as the carrier. Typically, the ionomer will be present in an amount of about 0.1 to about 90 percent, based on the total weight of the hot-melt ink, most usually from about 1 to about 25 percent, and preferably from about 2 to about 15 percent. Usually there is also present as part of the carrier in the ink formulation, other solid compositions such as the emulsifiers discussed below, and/or ethylene glycol distearate, or other stearate composition, as discussed below.

Within the scope of this invention, useful stearates include methyl stearate, ethyl stearate, n-propyl stearate, isopropyl stearate, n-butyl stearate, isobutyl stearate, isoamyl stearate, n-amyl stearate, and stearates as part of the group of aliphatic esters of stearic acid where the aliphatic ester linkage ranges from $C_6$ to $C_{30}$, such as $CH_3(CH_2)_{16}$ CO—$(CH_2)_x CH_3$ where x is 5 to 29.

Other useful stearates include cyclohexyl stearate, benzyl stearate, phenyl stearate, p-phenylphenacyl stearate, tetrahydrofurfuryl stearate, and stearanilide.

As part of the embodiment of this invention other stearates can be substituted or combined with the above. Included with this group is glycol monostearate, the mono-and di-stearate of: 1,2-propanediol and/or 1,3-propanediol; 1,2-, 1,3-, 2,3- and/or 1,4- butanediol; 1,2-, 1,3-, 1,4-, 1,5-, and/or 2,3-pentanediol; 1,6-, 2,3-, 2,5-, and/or 3,4-hexanediol; 1,7- and/or 2,4-heptanediol; and any combination of the tri-alcohol moieties named.

Also, other components and additives can be present, as discussed below.

In a preferred composition, from about 2 to about 15 percent of ionomers, from about 10 to about 90 percent of ethylene glycol distearate, and from about 5 to about 75 percent of triglycerol monostearate, and from about 0.1 to about 5 percent of an image-forming component will be present, based on the weight of the ink formulation.

EMULSIFIERS

The emulsifiers that may be employed in accordance with the present invention are typically non-ionic emulsifiers, that is compositions that have emulsifying properties and are further characterized as having both a polar and a non-polar group. Especially preferred emulsifiers are the mono-esters of triglycerol and the diesters of hexaglycerol, wherein the acid portion of the ester is a $C_8$ to $C_{22}$ alkyl or alkenyl acid moiety. Especially preferred are triglycerol monostearate and hexaglycerol distearate.

Also of use are the mono alkyl and alkenyl ethers of polyoxyethylene, wherein the alkyl or alkenyl group are $C_8$ to $C_{22}$ alkyl or alkenyl moieties and the polyoxyethylene has a molecular weight from about 500 to about 3,000.

The emulsifiers will typically be present in an amount from about 5 to about 75, based upon the total weight of the jet ink formulation. The ink formulation containing the emulsifiers will then also contain an ionomeric component, as discussed above, a eutectic component, or a crystalline component. Typical eutectic or crystalline compositions generally have melting points of from about 50° to about 130° C., and preferably from about 100° to about 120° C., as determined by observation and measurement on a microscope hot stage, wherein the material is heated on a glass slide and observed by microscope. Higher melting points are acceptable, although printhead life may be reduced at these temperatures.

IMAGE FORMING COMPONENTS

The compositions of the present invention also comprise one or more image forming components, preferably oil miscible or soluble. The image forming material can a colorant that forms a visual image on the substrate, e.g. it can be a dyestuff or pigment; or one which is detected by other means, e.g. it can be a magnetic material to be scanned by a suitable reader, or a fluorescent material, e.g. one which is detected by an ultra-violet or other radiation scanner.

The amount of image forming agent is not critical. Typically the amount of image forming agent will be from about 0.01 to about 10 percent, based upon the weight of the jet ink composition, preferably from about 0.05 to about 7.5 percent, and most preferably from about 0.1 to about 5 percent.

The colorant may be either a dye or a pigment. Exemplary dyes include the following list: solvent yellow 162, 79, 81, solvent orange 56, solvent brown 58, solvent red 122, 119, 100, solvent blue 70, solvent red 35, solvent black 27, 45, 47, solvent red 49, basic red 51, solvent violet 8, solvent blue 4, disperse yellow 64, solvent red 135, solvent red 195, disperse violet 26, solvent yellow 16, 56, 6, 7, 14, solvent red 1, 23, 24, 27, 49, solvent blue 35, disperse blue 14, solvent black 3, disperse orange 201, solvent yellow 93, disperse yellow 54, disperse red 60, solvent red 52, disperse violet 31, and the like.

Suitable dyes for use in the inks of the present invention also include Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc., and the like. Particularly preferred are solvent dyes, and within the class of solvent dyes, spirit soluble dyes are preferred because of their high compatibility with binder materials. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

Amongst pigments that may be successfully used are the following: pigment yellows 1, 3, 12, 13, 14, 16, 17, 73, 74, 81, 83, 97, 98, 106, 113, 114; pigment reds 2, 3, 4, 5, 6, 7, 8, 9, 12, 14, 37, 38, 48:1, 48:2, 48:3, 48:4, 57:1, 57:2, 57:3, 88, 122, 146, 147; pigment blues 15:1, 15:2, 15:3, 15:4, 56, 61, 61:1; and pigment blacks 1, 20, carbon black, acetylene black, bone black, lamp black, graphite, and the like.

Examples of other suitable pigments include Violet Toner VT-8015 (Paul Uhlich), Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330 Registered TM (Cabot), Carbon Black 5250 and Carbon Black 5750 (Columbian Chemicals Company).

OTHER COMPONENTS

The hot melt ink may contain a corrosion inhibitor in sufficient quantity to inhibit corrosion of metal placed in contact with the ink, without adversely affecting the printing characteristics of the ink.

Suitable corrosion inhibitors include from 0.5% to 5% of an essentially basic, heat-stable, metallo-organic sulphonate compound. The sulphonate compound may be selected from the group consisting of ammonium dinonyl naphthalene sulphonate, basic barium dinonyl naphthalene sulphonate, neutral barium dinonyl naphthalene sulphonate, ethylene diamine dinonyl naphthalene sulphonate, basic barium sulphonate naphthalene sulphonate, overbased sulphurized calcium alkyl phenate, basic calcium sulphonate, overbased calcium sulphonate and highly overbased calcium sulphonate.

The present invention may also comprise other additives, which may be any substance that can enhance the ink with regard to (i) improved solubility of other components, (ii) improved print quality, (iii) improved adhesion of the ink to the media, and (iv) control of wetting characteristics, which may be related to such properties as surface tension and viscosity, among other properties.

In addition, other optional additives such as dispersing agents or surfactants may be present. If present, they may be present in the ink in amounts of from about 0.01 to about 20 percent by weight. Further, commercially available as Benzoflex S552 (Velsicol Chemical Corporation, Chicago, Ill.), trimethyl citrate, commercially available as Citroflex 1 (Monflex Chemical Company, Greensboro, N.C.), N,N-dimethyl oleamide, commercially available as Halcomid M-18-OL (C. P. Hall Company, Chicago, Ill.), and the like, may be present.

GENERAL CONSIDERATIONS

The formulated jet inks of the present invention will exhibit the following characteristics, at their temperature of application: (1) a viscosity from about 5 to about 60 centipoises (cps) at a temperature of application from about 90° to 140° C. The modifications of the principal components of the inks, as disclosed above, to achieved these desired operational characteristics is well within the skill in the art.

Operating temperatures of the inks of the present invention are also generally from about 80° to about 130° C. Higher temperatures, again, are acceptable, although they may reduce the lifetime of the heater and printhead. Generally, the operating temperature is selected to obtain low ink viscosity while avoiding extensive fuming or smoking.

The viscosity of the jet ink composition at the operating temperature of the ink is generally from about 5 to about 60 centipoise, and preferably from about 6 to about 35 centipoise. Various, known viscosity modifying agents may be added as needed to adjust the viscosity of any given ink formulation. The ink composition, of course, should also be thermally stable in its molten state so that it does not undergo decomposition to yield gaseous products or to form heater deposits. The addition of known thermal stabilizing agents to achieve desired thermal stability is also within the skill of one in the art. Additionally, the jet ink composition should enable printed images with sufficient flexibility to prevent cracking or creasing.

Hot melt ink compositions of the present invention are generally prepared by combining all of the ingredients, heating the mixture to its melting point, which generally is from about 80° to about 130° C., and stirring the mixture for from about 5 seconds to about 30 minutes to obtain a homogeneous, uniform melt. When pigments are the selected colorants, the molten mixture may be subjected to grinding in an attritor or ball mill apparatus to effect dispersion of the pigment in the binder.

Printed images may be generated with the inks of the present invention by incorporating the inks into a thermal ink jet printer and causing droplets of the molten ink to be ejected in imagewise pattern onto a substrate such as paper or transparency material. Suitable printers for employing the inks of the present invention include commercially available ink jet printers.

The ink-jet inks of this invention avoids the problems of prior inks because they are solids or slurries at critical times in the printing procedure. At the time the ink of this invention strikes the medium, the vehicle droplets quickly penetrate the paper to leave a sharp, optically dense mark on the paper. The mark drys rapidly and is resistant to smearing.

The compositions of this invention can be applied to a wide range of porous and non-porous substrates, e.g. paper, metal, wood, plastics or glass without the need to form any special surface layer on the substrate. However, the invention is of especial use in forming images on non-porous materials, e.g. plastics, plastics coated materials, glass and metals. The high temperature of the composition as it is deposited on a plastics substrate causes enhanced adhesion of the composition due to partial fusion with the substrate. In the case of porous substrates the compositions penetrate into the substrate as they cool. In both cases, the compositions of the invention solidify rapidly on the substrate to give a sharp image resistant to smudging.

All patents and publications referred to herein are incorporated herein by reference.

The present invention is further illustrated by the following nonlimiting examples.

EXAMPLE 1

Preparation of Polyisobutylene Ionomer

One-half mol of liquified isobutylene (40.82 ml at −80° C.), 3.23 grams of dicumyl chloride and 500 of methylene chloride are placed into a (reaction (3 neck round bottom, 2000 ml) vessel, equipped with stir rod and bearing. To the stirred reaction mixture, 56 ml Boron trichloride is added and the resulting polymerization reaction allowed to proceed for approximately 30 to 45 minutes, at which time the reaction is terminated through the addition of approximately 30 ml of methanol. The reaction mixture is allowed to stir for approximately (allows most of $CH_3Cl$ to evaporate) 12 hours at which time approximately 300 ml of hexane is added to the reaction mixture which is then placed in a separatory funnel and washed with 5% HCL, three times, and subsequently washed with deionized water, three times. The polymer solution is then allowed to sit over magnesium sulfate for approximately one hour after which time it is poured through a basic (alumina oxide neutral was used) alumina column to remove any impurities (excess HCI). The column is washed with a small amount of hexane to remove any entrained polymer. The hexane solution is then placed in a rotary evaporator to remove most of the hexane, resulting in the recovery of approximately 24.11 grams of crude polymer. The polymer is then dissolved in 217 grams of methylene chloride (90/10% methylene chloride/polymer). Theoretical recovery for this procedure would have equaled approximately 29.0 grams of polymer, equivalent to 0.028 equivalence of chloride. The actual recovery of 24.11 grams of polymer was then equivalent to approximately 0.023 mols of chloride end groups for subsequent sulfonation. Accordingly, 2.25 grams of sulfuric acid (0.023 mols) and 2.35 grams of acetic anhydride (0.023 mols) were used by adding the acetic anhydride to the solution of the polymer in methylene chloride and the resultant mixture allowed to stir for approximately 10 minutes, after which time the sulfuric acid was added, with stirring, and allowed to react for approximately 6 hours. Ten ml of methanol was then added to stop any reaction and the reaction vessel (1000 ml one neck round bottom flask) was then stoppered and placed in a freezer overnight.

The product was removed from the freezer and allowed to warm to room temperature at which time it was placed on a rotary evaporator until most solvent was removed, at which time it was placed in a vacuum oven, without heat, to remove any remaining solvent. 21.7 grams of polymer were recovered. The polymer was dissolved in tetrahydrofuran, to which one to two drops of indicator was added and the solution titrated with potassium hydroxide/ethanol (0.1046M) until a colored end point was noticed.

The theoretical amount of potassium hydroxide/ethanol solution was 24.11 grams polymer÷2020 grams/mol×2 equivalents/mol of polymer=$2.38 \times 10^{-2}$ mols of chain ends÷$0.10461 \times 10^{-3}$ mols KOH per ml=2.28 ml required for neutralization. The actual titration resulted in 167.1 ml of KOH solution being used. The molecular weight for the polymer was determined from an NMR spectrum to be 2020.58 g/mole. cl EXAMPLE 2

Preparation of Hot Melt Ink Jet Resin Composition

To determine the range of ionomer content useful in making hot melt ink jet ink compositions, the ionomer prepared in accordance with Example 1 was blended with a previously prepared mixture containing 50% triglycerol monostearate and 50% ethyleneglycol distearate, by weight, with the following results:

| Ionomer | 50/50 Blend | Property |
|---------|-------------|----------|
| 0 | 100 | Hard, waxy, low melting |
| 10 | 90 | Semihard, waxy, sticky |
| 20 | 80 | Waxy, flexible, sticky |
| 50 | 50 | v. sticky, v. soft, waxy |

The results set forth above establish that the ionomer is capable of being utilized as a resin component in a hot melt ink jet ink formulation.

EXAMPLE 3

Ink Jet Ink Formulation

The components listed in the table below were combined to make a hot melt ink jet ink composition.

| Component | % Comp. | Wt (g) |
|-----------|---------|--------|
| Ethyleneglycol | 35 | 5.6 |
| Octadecanamide | 20 | 3.2 |
| Triglycerol-monostearate | 30 | 4.8 |
| Ionomer, Nat (from Example 1) | 15 | 2.4 |
| DYE: GREEN COLOR | | 16 g |
| Disperse Blue 14 | | 0.04 g |
| Disperse yellow 64 | | 0.04 g |
| Disperse red 60 | | 0.03 g |

The resulting solution was filtered through a 10 micron nominal filter with the filter housing heated to 120° C.

The ink formulation was jetted through a impulse hot melt printhead with the following results:

The printhead was set to a temperature of 117° C. Ink droplet formation was achieved at an input voltage of 20 volts and a pulse width of 18 microseconds. At a line speed of 90 ft/minute a print of 120 drops per inch was obtained. The print had permanency on non-porous and porous substrates. Print quality was improved by raising the voltage to 26 volts due to the viscosity range of the ink (23 to 26 centipoise) at the printing temperature.

What is claimed is:

1. A hot melt ink comprising, ionomers and an image-forming agent, wherein the melting point of the ionomers is from about 50° C. to about 130° C., said ink exhibiting, in the molten stage, a viscosity from about 5 to about 60 centipoises (cps) at a temperature within the range from about 90° to 140° C.

2. The ink of claim 1 wherein the ionomers contain from about 1 to about 15 mol % ionic groups pendant to a base polymer.

3. The ink of claim 2 wherein the ionomers contain from about 2 to about 10 mol % ionic groups.

4. The ink of claim 3 wherein the level of neutralization is from about 50% to about 150%.

5. The ink of claim 4 wherein the neutralization is done with metal hydroxides or metal oxides.

6. The ink of claim 1 wherein the ionomers are low molecular weight difunctional carboxyl-terminated polymers.

7. The ink of claim 6 wherein the ionomers are made by anionic polymerization or free-radical initiated polymerization processes.

8. The ink of claim 7 wherein the ionomers are made by free-radical initiated polymerization.

9. The ink of claim 8 wherein the molecular weight of the ionomer is from about 1,500 to about 6,000.

10. The ink of claim 9 wherein the ionomer is made from 1,3-butadiene and acrylonitrile.

11. The ink of claim 1 wherein the ionomer is present in an amount of about 0.1 to about 90 percent, based on the total weight of the.

12. The ink of claim 11 wherein the ionomer is present in an amount from about 1 to about 25 percent.

13. The ink of claim 9 wherein the ionomer is present in an amount from about 2 to about 15 percent.

14. The ink of claim 1 also comprising an emulsifier discussed, ethylene glycol distearate, or both.

15. The ink of claim 1 comprising from about 2 to about 15 percent of ionomers, from about 10 to about 90 percent of ethylene glycol distearate, from about 5 to about 75 percent of triglycerol monostearate, and from about 0.1 to about 5 percent of an image-forming component, based on the weight of the ink formulation.

16. The ink of claim 15 wherein the image-forming component is a dyestuff, a magnetic material, or a fluorescent material.

17. A method for ink jet printing comprising:
(a) providing a thermally reversible hot melt ink which is a solid at about 25° C. and a liquid at a temperature between about 50° C.–130° C., said ink comprising:
  (i) ionomers having a softening point below 80° C.; and
  (ii) an image-forming composition;
(b) elevating the temperature of said ink composition to between about 90° and about 140° C., to cause said ink to form a liquid solution or suspension of said image-forming composition;
(c) jetting said ink onto a substrate in the form of images;
(d) allowing said ink to harden upon cooling on said substrate.

18. A hot melt ink jet composition comprising a solid carrier component, an image-forming composition, and from about 5 to about 75 percent, by weight of an emulsifier, said ink being a solid at about 25° C. and a liquid at temperatures between about 50° C. and about 130° C.

19. The composition of claim 18 wherein the emulsifier is selected from the group consisting of monoesters of triglycerol and diesters of hexaglycerol, wherein the acid portion of the ester is a $C_8$ to $C_{22}$ alkyl or alkenyl acid moiety.

20. The composition of claim 19 wherein the emulsifier is triglycerol monostearate and/or hexaglycerol distearate.

21. The composition of claim 18 wherein the solid carrier is selected from the group consisting of ionomers, eutectic blend, or crystalline material, having a melting point from about 50° C. to about 130° C.

22. The composition of claim 21 wherein the solid carrier is selected from the group consisting of ionomers, eutectic blend, or crystalline material, having a melting point from about 50° C. to about 130° C.

23. The composition of claim 22 further comprising ethylene glycol distearate.

* * * * *

UNITED STATES PATENT AND TRADEMARK OFFICE
CERTIFICATE OF CORRECTION

PATENT NO. : 5,385,957
DATED : JANUARY 31, 1995
INVENTOR(S) : RUSSELL H. TOBIAS, NICHOLAS A. DAVIES, ANTHONY J. TORTORELLO AND ROBSON F. STOREY

It is certified that error appears in the above-identified patent and that said Letters Patent is hereby corrected as shown below:

Column 2, line 17, delete "4,3861,961" and substitute therefor -- 4,386,961 --;

Column 9, line 13, delete "Useful ionomers include:";

Column 18, line 48, after "500" insert -- ml --;

Column 19, line 39, after "g/mole." delete "cl"; and

Column 19, line 39, "EXAMPLE 2" should be on a line by itself and centered.

Column 20, line 56, after "the total weight of the" insert -- hot-melt ink --.

Signed and Sealed this

Thirteenth Day of June, 1995

Attest:

BRUCE LEHMAN

*Attesting Officer*     *Commissioner of Patents and Trademarks*